*Sherman & Marriott,*

*Stave Jointer.*

No. 113,214. Patented Mar. 28, 1871.

Witnesses,
Geo. W. Tibbitts
C. E. Wyman

Inventors,
John Sherman
Wm. Marriott

United States Patent Office.

JOHN SHERMAN AND WILLIAM MARRIOTT, OF CLEVELAND, OHIO.

Letters Patent No. 113,214, dated March 28, 1871.

IMPROVEMENT IN STAVE-JOINTERS.

The Schedule referred to in these Letters Patent and making part of the same.

We, JOHN SHERMAN and WILLIAM MARRIOTT, of Cleveland, in the county of Cuyahoga and State of Ohio, have invented certain Improvements in Cylinders for Stave-Jointers, of which the following is a specification.

The cylinders of stave-jointers have been heretofore made with slots, at one side of which the cutters were attached. In operation the shavings passing through the slots accumulate in the cylinder to such an extent as to seriously clog the same. Some cylinders, however, instead of being slotted, are simply grooved. In such cases the cutters have always been attached at the rear side of the groove, so as to project slightly over the same, and having the entire discharge in front of the cutters.

We have found that on this account these machines are defective, the discharge not being readily effected, but filling the groove immediately in front of the cutting-edge, and thus preventing satisfactory operation.

Our object has been to avoid this difficulty, and to this end—

Our invention consists in the attachment of the knives across the grooves or depressions, as hereinafter shown and described, whereby a discharge opening from the depression at the rear of the knife is produced of sufficient capacity to prevent clogging.

In the drawing—

A represents a cylinder, mounted on a shaft, B, the surface of the cylinder being curved from end to end to conform to the curve of a stave; the cylinder having heads or spokes in each end, thus secured to the shaft, makes it much stronger and steady.

In the sides of the cylinder we make grooves or cavities C C.

Figure 1:
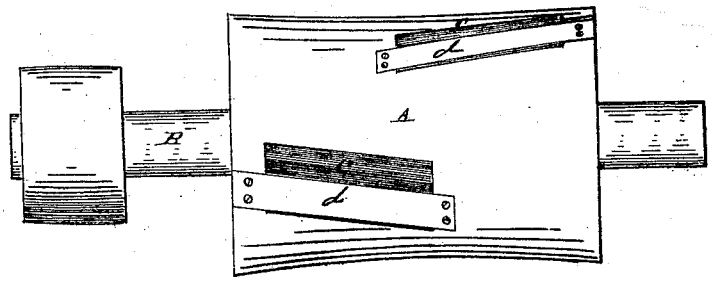
Figure 1 is a side view of a cylinder.
Figure 2:
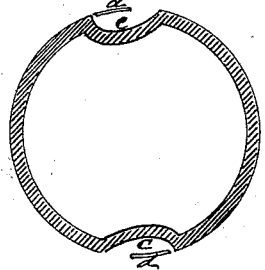
Figure 2 is a cross-section, showing our mode of construction.

We do not make openings through the cylinder, but make depressions in the casting, as seen at c, fig. 2, by which means we also retain the full strength of the cylinder, and the shavings are not admitted to the interior of the cylinder.

The grooves C C are made diagonally in the surface of the cylinder from the center toward the ends, and over them are secured the knives d d, lengthwise and near the front side of the grooves, the knives cutting the stave in manner like the common plane, the shavings being discharged out of the groove at the rear side of the knife and toward the ends of the cylinder, thus completely freeing the knives and cylinder from the shavings.

In the jointers where the cylinders are cut through and the shavings pass into the interior, they become soon filled with shavings and the knives become clogged, because the centrifugal force being so great the shavings are held within the cylinders; and in order to free them the machine has to be stopped and the shavings removed.

By the mode of constructing the cylinder we propose, the shavings do not get within them; thus we overcome that difficulty.

We do not claim, broadly, the construction of a stave-jointing cylinder with grooves or depressions instead of slots, as this is not new; but, having described our invention,

We claim—

The jointing cylinder herein described, having depressions c and knives d constructed, arranged, and operating in the manner and for the purpose specified.

JOHN SHERMAN.
WM. MARRIOTT.

Witnesses:
E. D. STARK,
S. F. ADAMS.